Feb. 19, 1963　　T. C. McGOW ETAL　　3,077,959
PRESSURE FITTING

Filed July 17, 1959　　2 Sheets-Sheet 1

INVENTORS
THOMAS C. McGOW
HARRY L. MacRAE
JAY HARRIS
BY *Price and Heneveld*
ATTORNEYS Feb. 19, 1963 T. C. McGOW ETAL 3,077,959
PRESSURE FITTING
Filed July 17, 1959 2 Sheets-Sheet 2
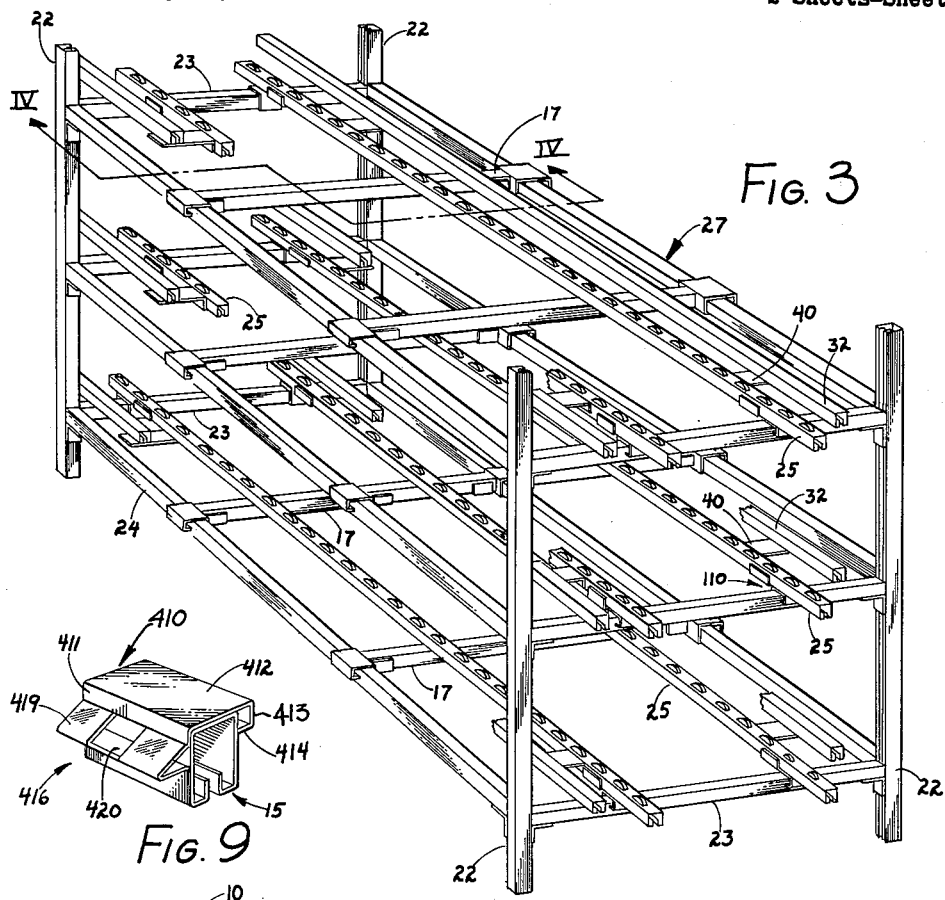
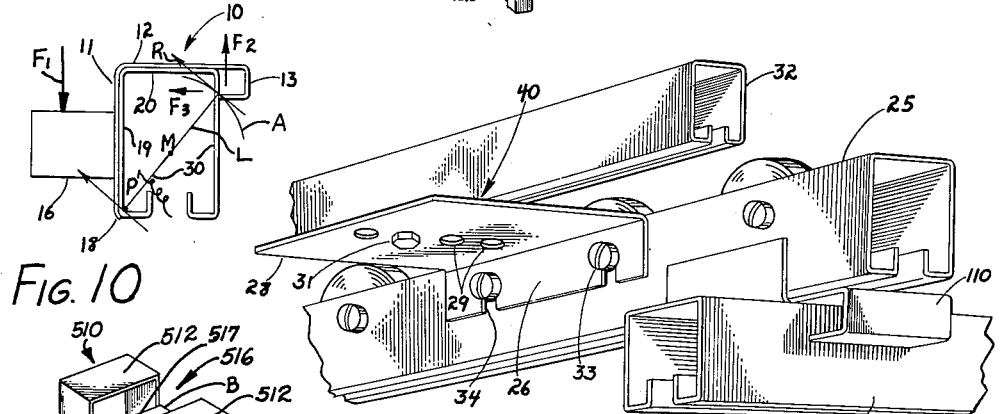
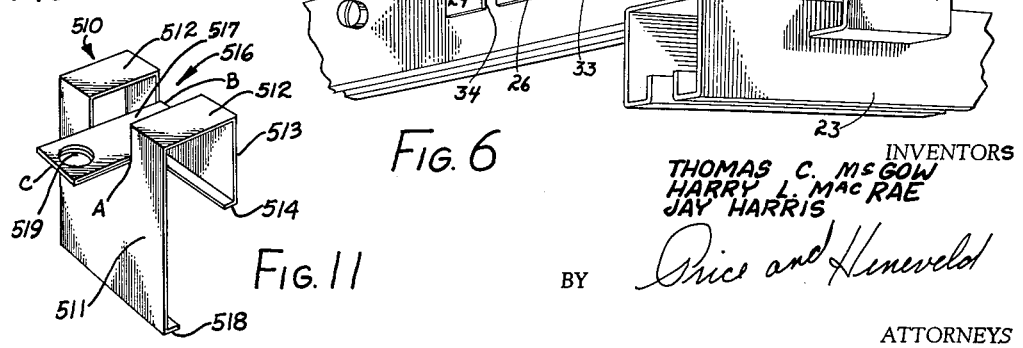
INVENTORS
THOMAS C. McGOW
HARRY L. MacRAE
JAY HARRIS
BY
ATTORNEYS

United States Patent Office 3,077,959
Patented Feb. 19, 1963

3,077,959
PRESSURE FITTING
Thomas C. McGow, Convent, Harry L. MacRae, Summit, and Jay Harris, Dunellen, N.J., assignors to The Rapids-Standard Company, Inc., Grand Rapids, Mich., a corporation of Michigan
Filed July 17, 1959, Ser. No. 827,777
11 Claims. (Cl. 189—35)

This invention relates to a pressure clamp bracket in general and more particularly to a pressure clamp bracket used in live storage racks. Previously in storage racks it has been the practice to assemble the channel members by standard L-shaped brackets and securing them together with nuts and bolts. Such a method of assembling the rack components is time consuming and, therefore, expensive laborwise. Therefore, it is an object of this invention to disclose a means whereby the members of a storage rack may be secured together and conveyor track members may be secured to the horizontal members without the use of conventional brackets, nuts and bolts.

It is a further object of this invention to disclose a pressure clamp bracket which can be assembled by merely snapping the bracket on a support member.

Another object of this invention is to disclose a pressure clamp bracket which can be quickly and easily adjusted laterally on the supporting member to the desired position, or readjusted to a new position.

Still another object of this invention is to disclose a pressure clamp bracket wherein a cross member can be replaced without removing the pressure clamp bracket from the support.

It is a further object of this invention to disclose a pressure clamp bracket provided with saddle means wherein a cross member can be secured to a longitudinal support member by merely placing the cross member in the saddle means.

Another object of this invention is to disclose a pressure clamp bracket provided with a saddle means whereby one horizontal member of a rack structure can be assembled to another by merely placing the member in the saddle means.

An additional object of this invention is the provision of means permitting one member to be joined to another at any place along the member without regard for the limitation in incremental adjustment imposed by a preselected hole pattern or the necessity for drilling fastener holes at the time of assembly.

A still further object of this invention is to disclose a pressure clamp bracket with saddle means whereby one horizontal member of a rack structure can be assembled to another without the use of bolts or nuts thus conserving valuable space usually occupied by the bolt or nut.

Another object of this invention is to disclose a pressure clamp bracket that can be quickly removed without removing nuts and bolts.

Still another object of this invention is to show a pressure clamp bracket for securing cross channels to horizontal channels without the use of nuts and bolts and thereby eliminating the necessity of hole patterns in the channels, thus making them stronger.

Another object is the provision of a means of assembling cross member pressure clamp brackets of a storage rack frame which will reduce the bay height of the racks.

The aforementioned objects, purposes and advantages in practicing this invention will be more apparent in the illustrations and descriptions of a working embodiment thereof which follow.

In the drawings:

FIG. 3 is a partially broken perspective view of a storage rack showing the pressure clamp brackets of this invention as used to assemble a storage rack;

FIG. 6 is an enlarged fragmentary perspective view showing the modified pressure clamp bracket of FIG. 5 supporting a conveyor channel member;

FIG. 9 is a perspective view of another modification of the pressure clamp bracket;

FIG. 10 is a schematic view of the pressure clamp bracket of FIG. 1 with a force diagram imposed thereon;

FIG. 11 is a perspective view of an additional modification of the pressure clamp bracket.

Figure 1:
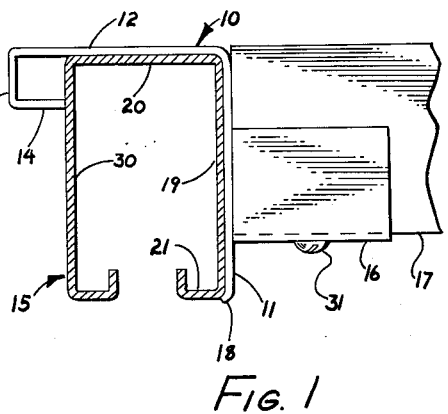
FIG. 1 is a side elevation view of the pressure clamp bracket of this invention.

Referring to drawings in greater detail, FIG. 1 shows a pressure clamp bracket designated generally as 10. The pressure fitting or clamp bracket has a first leg 11 adapted to lie adjacent the side of a support member generally 15. Integral with the first leg 11 and extending either normal or at a slight interior angle such as about 3° thereto is the shank of a J-shaped second leg 12 adapted to lie over the top web 20 of the support member 15. The support member 15, as illustrated in FIG. 1, is generally U-shaped, having a pair of generally parallel sides 19 and 30 and a top web 20.

The leg 12 is longer than the width of the support member 15 and therefore extends substantially beyond the exterior face of the side 30 of the support member. Integral with the outwardly projecting end of the shank of the leg 12 and disposed at an angle normal thereto is a first or yielding flange 13 which forms the bottom of the J. Integral with the bottom 13 and disposed at an angle normal thereto is a second or bearing flange 14 which forms the free end of the J. The free end 14 extends back toward the first leg 11 generally parallel to the shank of the leg 12 and its tip is adapted to abut the exterior face of the side 30 of the support member 15.

The first leg 11 has a lip 18 integral therewith which is turned inwardly toward the second leg 12. The lip 18 is adapted to engage and partially wrap around the end 21 of the support member and assure that the second leg 12 bears snugly against the top web 20 of the support member 15.

The pressure clamp bracket 10 is constructed so that the spacing between the tip of the free end 14 and the inside face of the leg 11 is somewhat less than the width of the support member 15. Therefore, when the pressure clamp bracket is seated about a support member, as in FIG. 1, the free end 14 must be spread slightly from the leg 11 and forced down the face of the side 30 of the support member 15. This creates clamping pressure, forcing both the leg 11 and the free end 14 to bear tightly against the opposite faces of the support member 15. When the bracket is properly seated, the leg 12 bears snugly against the face of the top web 20 and the lip 18 engages about the lower end of the support member.

While this invention may be used with supports of any internal construction it operates with the greatest efficiency with a generally U-shaped channel such as that shown in the drawings. In this case it is thought that some of the yielding which must occur to permit installation of the bracket 15 occurs in the channel as well as the bracket. This somewhat facilitates installation without loss of any of the resilient clamping pressures necessary to anchor the bracket to its support.

Figure 2:
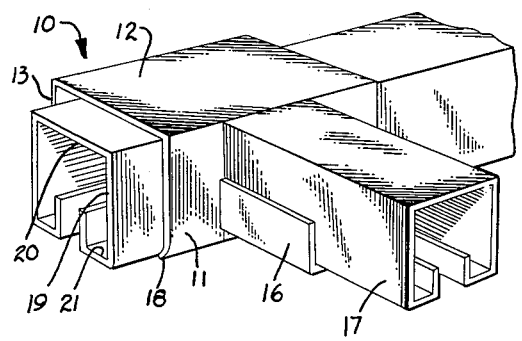
FIG. 2 is a perspective view of the pressure clamp bracket of FIG. 1.

The first leg member 11 is provided with a saddle 16. The saddle 16 is secured to the first leg 11 by suitable means such as welding. As shown in FIGS. 1 and 2, the saddle 16 is positioned on the first leg 11 so that a cross member 17 may be supported therein. While the saddle 16 may be so positioned that the top of the cross channel member 17 when disposed therein is flush with the surface of the second leg 12 of the pressure clamp bracket, this is not necessarily true as is illustrated in FIG. 1. The cross channel 17 may be locked to the saddle by any means such as screw 31 engaging a nut on the inside of the cross channel.

The pressure clamp bracket of FIG. 1 is shown in FIG. 3 as it is used in the assembly of a live storage rack 27. The live storage rack consists of vertical standards 22 which support and are attached to longitudinal supports 24. The vertical standards 22 and longitudinal supports 24 are tied together by cross supports 23. The pressure clamp brackets 10 are installed or clipped to the longitudinal supports 24 at spaced intervals along the length thereof. The saddles 16 of the pressure clamp brackets 10 provide a means for supporting the cross channels 17. The cross channels 17, along with the cross supports 23 provide a means for tieing together and stabilizing the standards 22 and supporting the conveyor tracks 25 of the live storage rack.

The manner of attaching the conveyor tracks 25 to the cross support members 23 will be described more fully hereinafter.

Figure 5:
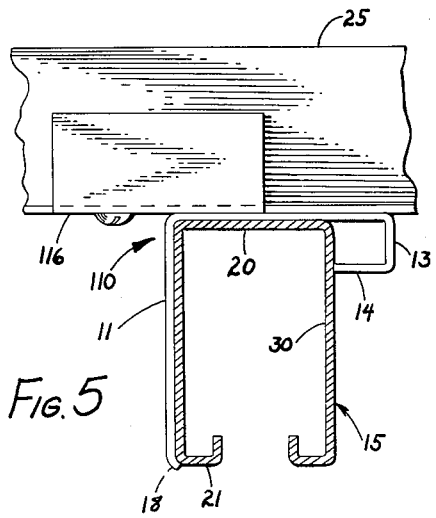
FIG. 5 is a side elevation view of a modified form of a pressure clamp bracket.

A modified form of the pressure clamp bracket is shown in FIG. 5 and is designated generally as 110. The pressure clamp bracket 110 is identical in every respect to the pressure clamp bracket 10 except for the location of the saddle 116.

The pressure clamp bracket 110 is provided with a saddle 116. The saddle 116 is secured to the pressure clamp bracket 110 by suitable means such as welding. The saddle 116 is secured to the second or top leg 12 of the pressure clamp bracket so that it may receive and support another member above the support member 15. As illustrated in FIG. 5, the other member may be one rail of a conveyor track 25. This position of the saddle 116 is particularly important where it is desired to extend the cross piece across the bracket.

The pressure clamp bracket of FIG. 5 is shown in FIG. 3 as it is used in a live storage rack. The pressure clamp brackets 110 are secured to the cross support members 23 and the saddle members 116 provide a means of securing the channel track members 25 to the live storage rack.

Figure 7:
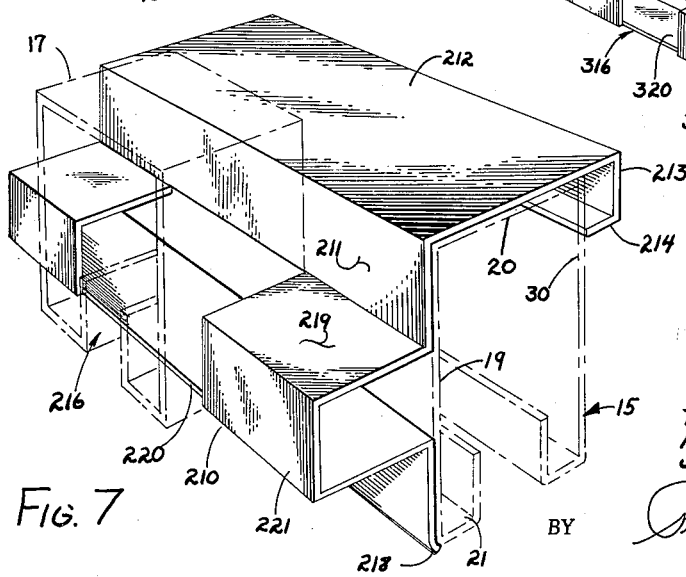
FIG. 7 is a perspective view of another modification of the pressure clamp bracket illustrating the rack members in phantom.

Another modification of the pressure clamp bracket is shown in FIG. 7 and is designated generally as 210. The pressure clamp bracket 210 has a first leg 211 and a second leg 212 integral therewith and disposed at an angle normal thereto. The second leg 212 is substantially longer than the top web 20 of the support member 15 and therefore extends beyond the exterior face of the side 30 of the support member.

Secured to the second leg 212 is a flange 213 integral therewith and disposed at a major angle thereto. Secured to the flange 213 is a bearing flange 214 integral therewith and disposed at an angle normal thereto. The bearing flange 214 is spaced from and is approximately parallel to the second leg 212 of the pressure clamp bracket 210. The free end or the bearing flange 214 of the leg 212 has its tip directed toward the first leg 211 of the pressure clamp bracket 210.

The first leg at its free end terminates in a lip 218 designed to wrap partially about the lower end of the support member 15. Intermediate the second leg 212 and the lip 218, the first leg 211 is offset outwardly to form a saddle generally 216. The saddle 216 consists of a pair of outwardly extending generally parallel arms 219 and 220 connected at their outer ends by a generally vertical web 221. A portion of the upper arm 219 and of the vertical web 221 is removed to create a socket for receiving and seating support member 17. The upper face of the lower arm 220 serves as a seat and vertical bearing support for the support member while the sides of the socket serve as stabilizers holding the support member against rotation or twisting. Thus, it will be understood that the socket and its preferred embodiment is fabricated to have a close fit with the sides of the support members. Additional stabilization may be obtained by installing a fastener such as a bolt through the lower arm 220 and tightening it to a nut in the channel member 17.

The pressure clamp bracket 210 is constructed so that the spacing between the free end of the bearing flange 214 and the inside face of the leg 211 is somewhat less than the width of the top end 20 of the support member 15. When the pressure clamp bracket 210 is seated upon a support member, the gripping action is similar to that of the pressure clamp bracket 10 previously described. Therefore, when the pressure clamp bracket 210 is clipped to a support member, the free end 214 of the second leg 212 must be forced upon the side 30 of the support member.

Figure 8:
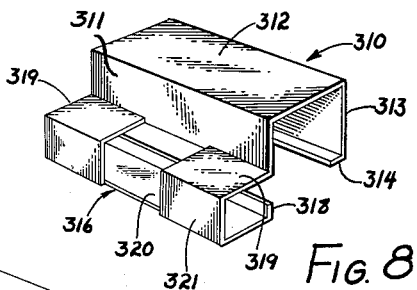
FIG. 8 is a perspective view of still another modified form of the pressure clamp bracket member.

FIG. 8 is still another modification of a pressure clamp bracket and is designated generally as 310.

The pressure clamp bracket 310 has a first leg 311 and a second J-shaped leg 312 integral therewith and disposed at an angle normal thereto. The second leg 312 is substantially longer than the top web of the support member and therefore extends beyond the exterior face of one side of the support member about which it is adapted to clamp. The shank of the second leg 312 has secured thereto a bottom portion 313 integral therewith and disposed at an angle normal thereto. The bottom portion 313 has a free end 314 secured thereto, integral therewith, and disposed at an angle normal thereto. The free end 314 is spaced vertically from and is parallel to the shank of the second leg member 312. The tip of the free end 314 is directed toward the face of the first leg 311 of the pressure clamp bracket 310.

The first leg 311 and its free end terminates in a lip 318 designed to abut against the side 19 of a support member 15. Intermediate the second leg 312 and the bottom of the lip 318, the first leg is offset outwardly to form a saddle generally 316. The saddle 316 consists of a pair of outwardly extending generally parallel arms 319 and 320 connected at their outer ends by a generally vertical web 321. A portion of the upper arm 319 and of the vertical web 321 is removed to create a socket for receiving and seating a support member such as 17. The upper face of the lower arm 320 serves as a seat and vertical bearing support for the support member 17 while the sides of the socket serve as stabilizers holding the support member against rotation or twisting. The saddle 316 is adapted to secure a support member such as 17 in a manner similar to the saddle 216 (shown in FIG. 7). Additional stabilization may be obtained by installing a fastener such as a bolt through the lower arm 320 and tightening it to a nut in the support member 17.

As in the other embodiments, the pressure clamp bracket 310 is constructed so that the spacing between the tip of the free end 314 and the inside face of the leg 311 is somewhat less than the width of the support member 15.

The pressure clamp member 310 is clamped to a support member 15 in a manner similar to the pressure clamp bracket 10 previously described.

Another modification of the pressure clamp bracket is shown in FIG. 9 and is designated generally as 410.

The pressure clamp bracket 410 has a first leg 411 and a second J-shaped leg 412 integral therewith and disposed at an angle normal thereto. The second leg 412 is substantially longer than the top web 20 of the support member and therefore extends beyond the exterior face of the one side of the support member about which it is adapted to clamp. Secured to the shank of the second leg 412 is a bottom portion 413 integral therewith and disposed at an angle normal thereto. Secured to the bottom portion 413 is a free end 414 integral therewith and disposed at an angle normal thereto. The free end 414 is vertically spaced therefrom and parallel to the shank of the second leg 412. The tip of the free end 414 is directed toward the face of the first leg 411 of the pressure clamp bracket 410.

The first leg 411 extends downwardly and is offset outwardly to form a saddle 416. The saddle 416 consists of a pair of outwardly extending arms 419 and 420. The arm 419 is at an obtuse angle to the first leg 411 and the arm 420 is at an acute angle to the arm 419 and parallel to the second leg 412. The free end face of the arm member 420 is adapted to abut the side 19 of a support member 15. A portion of the arm 419 is removed to create a socket for receiving and seating a support member such as 17. The upper face of the arm 420 serves as a seat and vertical bearing support for the support member, while the sides of the socket serve as stabilizers holding the support member against rotation or twisting. The socket of the pressure clamp bracket 410 is adapted to receive a channel or support member 15 in the same manner as the pressure clamp bracket 210 (FIG. 7). Additional stabilization may be obtained by installing a fastener such as a bolt through the arm 420 and tightening it to the nut in the support member 17.

The pressure clamp bracket 410 is constructed so that the spacing between the free end of the bearing flange 414 and the inside face of the leg 411 is somewhat less than the width of the support member 15. The pressure clamp bracket 410 is attached to a support member 15 in a manner similar to the pressure bracket clamp 10, as previously described above.

Although not shown, it is to be understood that the pressure clamp bracket 410 may be arranged to have the free end of the first leg terminate in a lip similar to the lip 218 of pressure clamp bracket 210 (FIG. 7), or a lip similar to the lip 318 of pressure clamp bracket 310 (FIG. 8).

The modifications of this invention shown in FIGS. 7, 8 and 9 are designed to be used in a live storage rack in a manner similar to the pressure clamp bracket 10 shown in the assembled live storage rack of FIG. 3.

An advantage of the pressure clamp bracket of FIGS. 7–9 is that they may be manufactured by stamping, blanking or braking and be provided with a saddle means without the necessity of welding an additional member thereon as is necessary with the pressure clamp brackets of FIGS. 1–5.

Even though the pressure clamp bracket is constructed so that the spacing between the tip of the free end and the inside face of the first leg is less than the width of the support member 15, it is not enough less so that the pressure clamp bracket will snap off the support member because of excessive clamping pressure fitting distortion. Rather, the spacing is such that the second flange member must be forced upon the support side upon which it is adapted to abut and form a secure grip against the face of the support member. By the same token, the spacing is not so great as to eliminate or greatly weaken the force fit of the free end about its support.

The principles of operation of this pressure clamp bracket will now be described. The operation of the several embodiments disclosed herein is basically the same. Therefore, only the operation of the pressure clamp bracket 10 will be explained in detail.

FIG. 10 schematically shows the pressure clamp bracket 10 with certain force arrows applied thereto. The direction of the force $F_1$ is indicated by the arrow, and represents the load applied to the saddle members 16 by the weight applied to the channel member 17. This force $F_1$ is transferred to the pressure clamp bracket 10 and results in component forces $F_2$ and $F_3$ about the tip of the free end 14. The pressure clamp bracket 10 attempts to rotate or pivot about the point P. The resultant force of the forces $F_2$ and $F_3$ is approximately on a tangent to an arc A struck from the point P and passing through the point of contact of the bearing plate 14 with the side 30 of the support member. Therefore, it can be seen that the resultant force of the free end 14 against the side 30 of the support member is such that the free end 14 tends to dig into or grip the side 30. Thus, the pressure clamp bracket 10 is securely attached to the support member 15.

The force pattern can also be illustrated by a couple. The resultant force R remains the same and the equal plus opposite force passes through the point P. The line L is the moment arm between the couple and passes through the point P and the point of contact of the bearing flange with the side 30 of the support member. The couple rotates around a moment center M.

In the modifications shown in FIGS. 8 and 9, the pivot point P is moved from the area of the lip 18 (FIG. 1) to the area of the lip 318 and the free end of the arm 420, respectively. This changes the direction of the resultant force R, since the arc passing through the point of contact of the free end 14 and the side 30 of the support is struck from a different center.

The couple changes accordingly since the moment arm L and center M changes position.

It is to be understood that the couple and resultant force can also be changed by increasing or decreasing the length of the bottom portion 13 and thereby changing the point of contact of the free end 14 with the side 30 of the support.

FIG. 6 shows an additional feature of this invention. A cross support 23 has clamped thereto a pressure clamp bracket 110 similar to the bracket shown in FIG. 5. The saddle 116 of the pressure clamp bracket has a conveyor track 25 secured and seated therein. Attached to the conveyor track 25 by fasteners 33 is a hanger plate generally 40. The fastener 33 may be the same fastener that secures the conveyor rollers 35 in position with respect to the conveyor track 25. The hanger plate 40 is an angle member having a rib 26 and a support rib 28 integral with and secured at an angle normal to rib 26. The rib 26 has slots 34 adapted to be positioned over the shanks of the fasteners 33 and secured to the conveyor track 25 thereby. The support rib has a plurality of apertures 29. The apertures 29 could be slots. The apertures 29 are adapted to receive fasteners 30 to secure a guide rail 32 to the hanger bracket. The guide rail 32 has a nut therein to receive the fastener 31. The apertures 29 are spaced at equal intervals along a line perpendicular to the conveyor track 25. This allows the guide rail 32 to be spaced at different distances from the conveyor track 25. The guide rail 32 is secured to the support rib 28 of the hanger plate 40 so as to lie parallel to the conveyor track 25.

The hanger plates 40 and guide rails 32 are shown in assembled position in FIG. 3. The guide rails serve the function of preventing excessive sidewise movement of the articles being conveyed on the tracks 25. The apertures 29 allow the guide rails 32 to be adjusted toward or away from the conveyor tracks 25 to allow for the size of the articles being conveyed.

FIG. 11 shows still another modification of a pressure clamp bracket, and is designated generally as 510.

The pressure clamp bracket 510 has a first leg 511 and a second J-shaped leg 512 integral therewith and disposed at an angle normal thereto. The second leg 512 is substantially longer than the top leg 20 of the support member (as illustrated in FIG. 10) and therefore extends beyond the interior face of the one side of the support member about which it is adapted to clamp. Integral with the outwardly projecting end of the shank of the leg 512 and disposed at an angle normal thereto is a bottom portion 513. Integral with the bottom portion 513 is a free end 514 which extends back toward the first leg 511 and lies generally parallel to the shank of the leg 512, and its tip is adapted to abut the exterior face of the side 30 of the support member 15.

The first leg 511 has a lip 518 integral therewith which is turned inwardly toward the second leg 512. The lip 518 is adapted to engage and partially wrap around the end 21 of the support member and assure that the leg 512 bears snugly against the top 20 of the support member 15.

The bearing flange 513, second leg 512, and first leg 511 are severed at two places spaced apart lengthwise of the fitting, and a bearing saddle 517 is formed from a portion of the leg 511 and portions of the shank and bottom of the leg 512. The bearing saddle 517 is formed by merely bending the cutout portion of the bottom 513 at point B, the cutout portion of leg 511 at A, and pressing the portion of 512 against the portion of the leg 511 causing a reverse bend at C. This results in a bearing saddle 517 which lies generally parallel to the shank of leg 512, and extends outwardly beyond the leg 511, as shown in FIG. 11.

It can be seen from FIG. 11 that the material struck from the bottom portion 513, the shank of second leg 512 and the first leg 511, forms the bearing saddle 516 which is adapted to receive and seat a support member in a manner similar to the saddle 16 or FIG. 1. The outwardly projecting portion of the web 517 is provided with an aperture 519 which is adapted to receive a fastener such as the fastener 31 in FIG. 1, and thereby secure a support member such as the support member 17. Notice that the flange 513 and leg 511 are severed to the points A and B which are equally spaced from the second leg 512. Thus, when the web 517 is formed therefrom the bend point C of the flange 517 corresponds with the junction point of the legs 511 and 512.

Should the pressure clamp bracket 510 be made of stock of such thickness that the bend C of the web 517 would be impractical, the web 517 may be severed at the point C and the web 517 formed by bending the material at points A and B. If necessary the formed pieces may be rejoined by suitable means such as spot welding.

Figure 4:
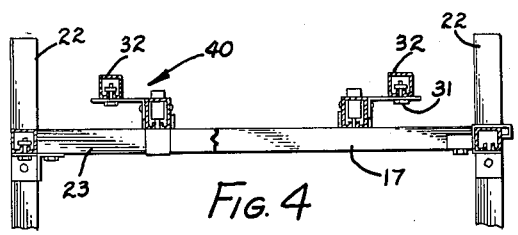
FIG. 4 is a sectional elevation view taken along the plane IV—IV of FIG. 3.

The advantages of the various types of pressure clamp brackets disposed herein should be obvious. As shown in FIGS. 3 and 4, it is possible to position or adjust any of the pressure clamp brackets described above along the cross member 23 within the bounds of the vertical supports 22. This adjustment can be made by merely taking a hammer or some other object and tapping the pressure clamp bracket to any desired position along the member 23. This can be done without removing and replacing screws or nuts and bolts. Also, a very small adjustment, for instance in the neighborhood of a sixteenth of an inch, or several inches of adjustment can be made without regard to the limitations imposed by the necessity of aligning to a predetermined hole pattern formed in the cross member. Also, the cross members such as 23 are much stronger since they are void of the pattern of holes conventionally in frame work of this type.

Another advantage of the pressure clamp bracket disclosed herein is that the bay height or vertical distance between the cross members such as 23 can be less than in the conventional type live storage rack. The saddle 16 of a pressure clamp bracket such as 10 can be mounted so that the upper surface of the support member carried thereby is lower than the upper surface of the member which carries the bracket itself. Therefore, the rail such as 25 which supports the conveyor wheels can be mounted lower than could a live storage rack rail of the conventional type. This results in a decrease in the vertical distance necessary between the supports of the bay height distance. Since the bay height is decreased, it is possible in storage racks of substantial height to provide for one or more additional bays of storage not available in the conventional type of storage racks. Thus, it can be seen that the use of the pressure clamp bracket disclosed herein provides a means for utilizing space which would otherwise be lost with a conventional type storage rack. Since in most instances space is at a premium, this invention affords a real advance in the storage rack field.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

We claim:

1. Means to be frictionally attached to a support generally U-shaped in cross-section and having a pair of spaced faces forming the legs of said U, said means comprising: a clip of ribbon-shaped resilient material lying in planes normal to the plane of said U, and bent to form a first leg adapted to lie flatly against at least a part of one of said faces and having an extremity engaging said one face; a second leg integral with said first leg and extending generally normal thereto in the direction of the other of said faces; said second leg being generally J-shaped and having a shank, bottom, and free end, said bottom and free end being located entirely beyond said second face, said free end being adapted to bear against said second face at substantially a right angle at a level between the level of said shank and the tip of said leg; the spacing between the tip of said free end and the adjacent surface of said first leg being slightly less than the spacing between said faces whereby said first leg and said free end of said second leg are adapted to tightly clamp said support when said clip is attached to said support.

2. The device of claim 1, in which said extremity of said first leg is inclined at a minor angle toward said second leg whereby said extremity of said first leg may extend partially about the edge of said support opposite from said second leg.

3. The device of claim 1, in which said first leg includes a plurality of spaced surfaces lying flatly against said one face, and a portion between said surfaces projecting oppositely from said second leg for forming a rail receiving saddle.

4. The device of claim 1, in which said U-shaped support is a first rail, and said clip has means thereon for supporting a second rail at an angle to said first rail.

5. The device of claim 1, in which said clip has an anchor saddle secured thereto.

6. The device of claim 5, in which said anchor saddle is secured to said second leg.

7. The device of claim 5, in which said anchor saddle is secured to said first leg and projects outwardly therefrom oppositely from said second leg.

8. Means to be frictionally attached to a support having a pair of spaced faces, said means comprising: a clip of resilient material having first and second legs arranged at a major angle to each other; said first leg having surfaces spaced apart lengthwise thereof adapted to bear against one face of said support; the free end of said second leg being turned back upon itself to have a reversely extending flange spaced from the main portion of said second leg in the direction of the free end of said first leg; said first leg between said surfaces having a portion projecting oppositely from said second leg; said portion having a pair of walls generally parallel to said second leg and spaced apart and connected by a web extending in the same general direction as said one face of said support; the one of said walls adjacent said second leg and said web being notched to form a rail receiving saddle; the free end of said flange being spaced from said surface of said first leg a distance less than the spacing between said faces of said support.

9. Means to be frictionally attached to a support having a pair of spaced faces, said means comprising: a clip of resilient material having first and second legs arranged substantially normal to each other; said first leg having a first bearing surface adapted to engage a face of the support, said first bearing surface being adjacent the juncture of said first and second legs; a saddle formed in said first leg along the edge of said first bearing surface remote from said juncture; said saddle being U-shaped and extending oppositely from said second leg and having a pair of sides and a web remote from said first bearing surface; said first leg having a second bearing surface at the end of said side of said saddle remote from said first bearing surface; said web and the side of said saddle adjacent said first bearing surface being notched to form a rail receiving opening; the free end of said second leg being turned back upon itself to have a reversely extending flange spaced from the main portion of said second leg in the direction of the free end of said first leg; the free end of said flange being spaced from said bearing surfaces of said first leg a distance less than the spacing between said faces of said support.

10. Means to be frictionally attached to a support having a pair of spaced faces, said means comprising: a clip of resilient material having first and second legs arranged substantially normal to each other; said first leg having a pair of bearing surfaces and a generally U-shaped saddle; said bearing surfaces being spaced apart with said saddle therebetween; said bearing surfaces being adapted to bearing against one face of the support; said saddle projecting away from said second leg; said saddle being notched to receive and seat a rail therein; the free end of said second leg being turned back upon itself to have a reversely extending flange spaced from the main portion of said second leg in the direction of the free end of said first leg; the free end of said flange being spaced from said bearing surfaces of said first leg a distance less than the spacing between said faces of said support.

11. Means to be frictionally attached to a support having a pair of spaced faces, said means comprising: a clip of resilient material having a first leg adapted to lie against one of said faces; a second leg integral with said first leg and extending generally normal thereto in the direction of the other of said faces; a free end of said second leg being turned back upon itself to have a reversely extending flange; said flange having a first portion substantially parallel to said first leg and a second portion substantially parallel to the main portion of said second leg and adapted to bear against said second face; the spacing between the end of said second flange portion and the adjacent surface of said first leg being slightly less than the spacing between said faces whereby said first leg and said end of said flange are adapted to tightly clamp said support when said clip is attached to said support; a strip integral with said clip on both of its ends and severed therefrom along both of its side margins; said strip extending from a point on said first flange portion intermediate said flange and said second leg, across said second leg to a point on said first leg spaced from said second leg substantially equally to the spacing between said second leg and the point of attachment of said strip to said first flange portion; said strip being bent into said clip to form a bearing saddle lying substantially parallel to said second leg substantially in the plane of said points of attachment of said strip to said first leg and, first flange portion; said bearing saddle projecting outwardly from said clip adjacent said first leg.

References Cited in the file of this patent

UNITED STATES PATENTS

| | | |
|---|---|---|
| 625,427 | Stewart et al. | May 23, 1899 |
| 962,528 | Rockwell | June 28, 1910 |
| 1,033,414 | Kahn | July 23, 1912 |
| 1,097,934 | Price | May 26, 1914 |
| 1,271,350 | Moon | July 2, 1918 |
| 1,854,645 | Crysler et al. | Apr. 19, 1932 |
| 2,376,966 | Ingerman | May 29, 1945 |
| 2,500,636 | Isakson | Mar. 14, 1950 |
| 2,652,885 | Engel | Sept. 22, 1953 |